United States Patent
Axelsson et al.

(10) Patent No.: US 12,391,176 B2
(45) Date of Patent: Aug. 19, 2025

(54) SEAMLESS INTEGRATION OF ILLUMINATION INTO INTERIOR TRIM PANELS WITH DECORATIVE SURFACE MATERIALS

(71) Applicant: Volvo Car Corporation, Gothenburg (SE)

(72) Inventors: Martin Axelsson, Gothenburg (SE); Mathilda Andreasson, Onsala (SE); Johan Persson, Torslanda (SE); Erik Åleby, Hovås (SE); Henrik Wilhelmsson, Gislaved (SE); Johan Elwing, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 320 days.

(21) Appl. No.: 17/847,259

(22) Filed: Jun. 23, 2022

(65) Prior Publication Data
US 2023/0001852 A1    Jan. 5, 2023

(30) Foreign Application Priority Data

Jun. 30, 2021  (NL) ........................................ 2028591
Jul. 16, 2021  (EP) ..................................... 21186243

(51) Int. Cl.
*B60Q 3/78*    (2017.01)
*B29C 45/16*   (2006.01)
(Continued)

(52) U.S. Cl.
CPC ............ *B60Q 3/78* (2017.02); *B29C 45/1671* (2013.01); *B60R 13/0206* (2013.01);
(Continued)

(58) Field of Classification Search
CPC ... B60Q 3/78; B29C 45/1671; B60R 13/0206; B62D 65/14; B29L 2031/3041
See application file for complete search history.

(56) References Cited

U.S. PATENT DOCUMENTS

| 2009/0129107 A1* | 5/2009 | Egerer ..................... B60Q 3/68 362/509 |
| 2009/0174121 A1 | 7/2009 | Hayes et al. |

(Continued)

FOREIGN PATENT DOCUMENTS

| CN | 102416910 A | 4/2012 |
| CN | 105564339 A | 5/2016 |

(Continued)

OTHER PUBLICATIONS

Dec. 16, 2021 European Search Report issued in International Application No. 21 18 6243.

(Continued)

*Primary Examiner* — Christopher E Dunay
(74) *Attorney, Agent, or Firm* — Clements Bernard Walker; Christopher L. Bernard (57) ABSTRACT

A decorative cover for a back-illuminated interior trim panel for a vehicle, said cover being a sturdy shell-structure including a transparent plate, forming the back side of the shell-structure, and a decorative component top layer including a trim material layer, which forms the outer surface of the decorative cover, wherein the trim material layer is formed from a trim material which is one from a group of materials consisting of a wood veneer, a metallic layer, a paper, a textile and a fabric, and wherein the laminate is configured to have a predetermined degree of translucency.

15 Claims, 3 Drawing Sheets

(51) Int. Cl.
  *B60R 13/02* (2006.01)
  *B62D 65/14* (2006.01)
  *B29L 31/30* (2006.01)

(52) U.S. Cl.
  CPC ...... *B62D 65/14* (2013.01); *B29K 2995/0029* (2013.01); *B29L 2031/3041* (2013.01); *B60R 2013/0287* (2013.01)

(56) References Cited

U.S. PATENT DOCUMENTS

| | | | | |
|---|---|---|---|---|
| 2014/0211498 | A1* | 7/2014 | Cannon | B60Q 3/217 |
| | | | | 362/555 |
| 2020/0103093 | A1* | 4/2020 | Negel | B60Q 1/2661 |
| 2020/0307302 | A1 | 10/2020 | Kensuke | |
| 2021/0268907 | A1* | 9/2021 | Zimmermann | H03K 17/9622 |
| 2023/0192010 | A1* | 6/2023 | Erler | B32B 7/023 |
| | | | | 428/201 |
| 2023/0278490 | A1* | 9/2023 | Lange-Mao | B60K 35/60 |
| | | | | 362/511 |
| 2024/0053528 | A1* | 2/2024 | Martin | G02B 6/0058 |
| 2024/0159957 | A1* | 5/2024 | Bucar | G02B 6/0091 |
| 2024/0181882 | A1* | 6/2024 | Stieglitz | B60K 35/22 |

FOREIGN PATENT DOCUMENTS

| | | |
|---|---|---|
| EP | 3000593 A1 | 3/2016 |
| EP | 3006265 A1 | 4/2016 |
| WO | 2020106573 A1 | 5/2020 |

OTHER PUBLICATIONS

Office Action issued in corresponding Chinese case 202210762921.6.

* cited by examiner

SEAMLESS INTEGRATION OF ILLUMINATION INTO INTERIOR TRIM PANELS WITH DECORATIVE SURFACE MATERIALS

CROSS-REFERENCE TO RELATED APPLICATIONS

The present disclosure claims the benefit of priority of co-pending Netherlands Patent Application No. 2028591, filed on 30 Jun. 2021, and European Patent Application No. 21186243.8, filed on 16 Jul. 2021, the contents of both of which are incorporated in full by reference herein.

TECHNICAL FIELD

The present disclosure relates to a decorative cover for a back-illuminated interior trim panel for a vehicle, said cover being a sturdy shell-structure including a transparent plate, forming the back side of the shell-structure, and a decorative component top layer forming the front side of the shell-structure. Further, the present disclosure relates to an interior trim panel for a vehicle. Finally, the present disclosure relates to methods of manufacturing a decorative cover and a method of manufacturing an interior trim panel.

BACKGROUND

Interiors of luxury vehicles are increasingly turned into nice, welcoming environments which are provided with decorative ambient lighting. In particular, such lighting is increasingly being integrated in interior trim panels.

A known interior atmosphere lamp, integrated as a trim panel, for example, includes an LED backlight source and an interior display panel installed on the upper surface of the LED backlight source. The interior display panel is made of IML (In-Mold Injection Molding). The luminous content required for the display is obtained through the production of IML film. The display content can be characters (such as welcome, or car model or brand words, etc.), or various shapes or patterns. A downside of this interior atmosphere lamp is that the light-pattern appears to be on show both when the light is on and off.

A possible manner of providing a decorative pattern which is only visible when the light is on is achieved in an alternative known panel, which is provided with a decorative pattern via injection moulding surface decoration technology (IMD technology) with which decorative patterns such as metal mirrors, matt surfaces, and wooden textures can be formed on the surface of automotive interior parts to increase the decorativeness. The pattern on the outer surface of the panel consists of two different layers which have a superimposed effect and wherein the pattern of the upper layer is used as a decorative pattern of the decorative compartment during the day. High light-transmissive areas of the other layer in the pattern are available for the light to pass through as a decorative pattern for the night decoration.

A downside of this interior atmosphere lamp is that the material facing the inside of the vehicle, i.e. what is experienced by the users, is an injection moulded material, which normally is a hard plastic. Such material is often not perceived as having a luxurious look and/or feel, compared to trim panels having an opaque decorative surface material which is for example made from wood, metal or fabric.

A further known alternative for a light-transmissive automotive interior component, in which the body panel is opaque, is provided with a hollow portion, and the back surface of the body is sequentially provided with a light-transmitting layer and a light-emitting layer. Further, a convex portion is formed on the light transmissive layer, and the convex portion is embedded in the hollow portion to make the surface of the body smooth.

A downside of the decoration having surfaces with perforations and/or translucent inlays is that in order to create such surfaces more process steps are required. The cost of such materials are also higher and material scrap is increased when surfaces are perforated.

SUMMARY

There may be a need to provide more robust and durable illuminated interior trim panels with luxurious decorative surface materials.

Further, there may be a need to provide illuminated interior trim panels with luxurious decorative surface materials at relatively low cost.

According to a first aspect of the present disclosure a decorative cover for a back-illuminated interior trim panel for a vehicle is provided. Said cover being a sturdy shell-structure including a transparent plate, forming the back side of the shell-structure, and a decorative component top layer including a trim material layer, which forms the outer surface of the decorative cover, wherein the trim material layer is formed from a trim material which is one from a group of materials consisting of a wood veneer, a metallic layer, a paper, a textile and a fabric, and wherein the decorative component top layer is configured to have a predetermined degree of translucency.

The decorative component top layer, which has the trim material forming an outside surface, gives the decorative cover a luxurious look and feeling, comparable to the look and feeling provided by commonly applied interior trim panels of these materials without back-lighting. The trim material forming the outer surface should be understood as the trim material having formed a substantially homogeneous layer over the entire front side of the shell-structure. Thus when no light is on, behind the decorative cover panel, the panel is substantially indistinguishable from other luxurious trim panels.

The predetermined degree of translucency can be achieved as an inherent layer property, for example through use of a particularly thin layer of material, a particular tightness in weft or meshing. This translucency is similar to the translucency found in lamp-shades, which allows a light that is provided directly behind the decorative cover to shine through. Preferably, the predetermined degree of translucency of the trim material layer is such that the decorative cover has a translucency between 5% to 15.%. Hereto the thickness of the trim material layer is relatively thin, between 0.1 to 1.0 mm, depending on the type of material. For wood veneer, a typical thickness is between 0.2 mm and 0.8 mm.

The transparent plate is preferably made from an injection moulded plastic material, such as polycarbonate (PC), polymethylmethacrylate (PMMA) or methyl methacrylate-acrylonitrile-butadiene-styrene (MABS), which material provides the required transparency, as well as durability and safety throughout a vehicle's lifetime.

This allows the decorative cover being manufactured in relatively few manufacturing steps. In an embodiment, the sturdy shell-structure is formed by back-injecting against the decorative component top layer, such that the sturdy shell-structure is a seamless, single component structure, and wherein the decorative component top layer is non-permeable to the back-injected material.

The decorative cover material acts as a barrier to the injected material, allowing the cover being formed in a single injection moulding step, without requiring post-processing in order to have a decorative trim material on the outside of the cover which allows light to pass in a desired pattern. The non-permeability of the decorative cover material prevents said injection moulding material from flowing through the trim material and thereby impacting the look and feel thereof. This results in relatively low manufacturing costs for the panel made with a luxurious outer surface. The laminate may be pre-shaped into the desired shape of the decorative cover prior to injection moulding. Both the formation of the decorative cover material and the subsequent pre-shaping and injection steps result in relatively little waste material, such that manufacturing costs are further limited.

In an embodiment, the transparent plate, at predetermined sections, is provided with shading means, for locally reducing an amount of light being transmitted through the plate. When integrated in the back-illuminated interior trim panel, sections of the cover located directly adjacent a light will emit a higher amount of light than sections of the cover located elsewhere, resulting in an un-desired uneven lighting pattern. Additionally, or alternatively, a particular lighting pattern may be desired, without having to place a large amount of lights below the cover such that said pattern is achieved. The provision of shading means provides a solution hereto. The shading means may be independent components, which are adhered onto the inner surface of the transparent plate. Preferably, however, the shell-structure is a seamless, single component structure. Said structure may be achieved by having the transparent plate form the entire inner surface of the decorative cover plate, onto which tape or paint is provided to predetermined sections, said tape or paint being shading means. Alternatively, the shading means may be integrally formed with the transparent plate in a two-component injection process, using a single mould. The shading means have a transparency which is lower than a transparency of the decorative cover in areas where no shading means are provided. The shading means may be non-transparent means.

In an embodiment, the decorative component top layer is a laminate, which includes an upper layer consisting of the trim material layer, and a backing material layer. Depending on the particular trim material chosen for the decorative cover, a backing material may be required to ensure that the laminate is sufficiently stable to allow handling during manufacturing without fracturing the trim material, which handling may include shaping into a shell pre-shape prior to back-injecting. Alternatively or additionally, a backing material may be required to ensure that the laminate is impermeable to material with which it back-injected and/or adhered to the transparent plate. In particular, meshed trim materials, such as for example expanded metal, require a backing material to ensure the decorative component layer is non-permeable to the material which is being back-injected, in order to ensure the trim material forms the outer surface of the decorative cover, i.e. without back-injected material also being present on the outer surface of the decorative cover. Wood veneers already poses the required non-permeability, however, in order to be sufficiently sturdy to allow handing throughout manufacturing, a backing is required to stabilize the thin layer of the wood veneer.

In an embodiment, the backing material layer is formed by one of a fleece, a fabric or a plastic foil. The particular material chosen as backing material may depend on the trim material used. In particular, for trim materials with a relatively open structure, such as expanded metal (foil) or particular weaves of fabric, a plastic foil is a preferred backing material, since a fleece or other fabric may impact the look of the panel by being visible through the structure of the trim material.

In an embodiment, a back surface of the decorative component top layer is provided with a black-out pattern and/or a fade pattern print, or wherein a further plastic foil layer is provided adjacent the backing material layer, said further plastic foil being provided with the black-out pattern and/or the fade pattern print. A black-off pattern print and/or fade print may be added to provide masking and/or shading of predetermined areas of the decorative cover. The purpose of the print is to shade and/or block certain light intensive areas, such as directly adjacent an LED located below the decorative cover when assembled into the back-illuminated interior trim panel, and/or to create a decorative pattern and/or fade. The use of a fade print may in particularly be desirable when some areas are masked through the use of non-transparent shading means. The print then provides a more gradual change from the masked area to the lighted area. The patterns may both be provided, either independently, or as a merged single pattern.

The back surface of the decorative component top layer may be formed by a back surface of the trim material or the backing material layer. Printing on plastic foil offers a greater resolution in the print than printing on fleece or fabric, which may also be used as backing material. Therefore, it may be preferred to add an additional layer of plastic foil, if the backing material used in the laminate is not already a plastic foil.

In an embodiment, the trim material layer is provided with a coating for protecting the surface from moisture, heat and/or UV exposure. The coating results in the decorative cover looking as good as new for longer, i.e. improving the durability thereof. Depending on the trim material chosen, the coating may be applied after or prior to back-injecting the transparent layer, since the front side of decorative material layer is not affected by the injection process. Moreover, when expanded metal is used as trim material, the metal may even be coated prior to expansion thereof.

According to a second aspect of the present disclosure, an interior trim panel for a vehicle is provided, including a decorative cover according to the first aspect of the disclosure, further including a light source component including: a carrier plate, shaped to form a back surface of the interior trim panel and having a reflective surface, at least one LED light, mounted onto the reflective surface, and a light plate, positioned adjacent to the at least one LED light onto the reflective surface, such that the light plate transfers the light of the at least one LED light over a surface area thereof, and wherein the decorative cover is attached to the carrier plate, such that the interior trim panel is a closed light unit with the decorative cover forming a front surface thereof and the decorative cover and carrier plate together enclosing the at least one LED light and light plate. Thus, in the interior trim panel, the decorative component has a seamless outer surface which completely covers the light source component, when installed into a vehicle. The reflective carrier helps effectively to force the light through the decorative cover. The reflective surface of the carrier may be obtained inherently through the material from which the carrier plate is formed, i.e. a metallic material, or provided to the carrier plate as a reflective layer, for example as a foil layer or a paint. The design of the light source is built up by at least one LED light and a light plate that transfers the light and spreads it evenly.

According to a third aspect of the disclosure, a method of manufacturing a decorative cover for a vehicle interior trim panel including a light source component is provided, wherein the method includes:

providing a non-permeable decorative component top layer, including a trim material layer which is formed from a the trim material that is one from a group of materials consisting of a wood veneer, a metallic layer, paper, textile and fabric, and which is configured to have a predetermined degree of translucency;

optionally, shaping the decorative component top layer into a shell pre-shape having a desired geometry for forming an outer surface of the decorative cover; and back-injecting the decorative component top layer with a translucent material, to form a seamless sturdy shell-structure, with the trim material forming an outer surface and said translucent plastic forming an inner surface of the decorative cover. In the cases where the geometry of the trim panel is relatively flat it might not be necessary to pre-form the trim material. In such cases the trim material (with or without backing) and the plastic foil (if required) can be added separately to the back injection tool to create "in-tool lamination".

In an embodiment, the providing of a non-permeable decorative component top layer includes forming a laminate by attaching the layer of trim material onto a backing material layer and optionally further includes sanding down the layer of trim material to a minimum thickness after attaching said trim material onto the backing material layer to achieve the predetermined degree of translucency. In particular for wood veneer and paper, the reducing of the thickness can be performed by sanding down to a minimal thickness, without compromising the stability, due to the material being laminated onto the backing material. Sanding is a simple and cheap production step, especially when performed on flat objects as the laminate is prior to pre-shaping.

In an embodiment, the providing of a non-permeable decorative component top layer includes the expanding and/or stretching of the layer of trim material, and hen the layer of trim material is attached onto a backing material layer afterwards, the backing material layer is a plastic foil. This is an alternative method to achieving a predetermined degree of translucency. In particular metals, foils and fabrics may be expanded and/or stretched.

In an embodiment, the back-injecting of the component top layer with a translucent material, to form the sturdy shell-structure, is performed with a two component injection process, wherein a first component is the translucent material and wherein a second component is a shading material that reduces light transfer therethrough, wherein said second component is injected in predetermined areas where light from the light source is to be masked. The shading material is used to mask area's through which light would otherwise unwantedly leak, such as for example an area of the cover directly above an LED covered by said light, or for example the edges of the cover, where said cover is attached the light source component. Preferably, the shading material is chosen such that the light directly transmitted by the LED is shaded to substantially match a light transmitted through the decorative cover which is emitted via the light plate, thereby ensuring a substantially even amount of light being emitted over the entire surface of the decorative cover. The degree of shading depends on the particular interior trim panel design and may range between a level of shading sufficiently to cause a similar amount of light being emitted through the panel directly above the LED as through the panel above the light plate and 100% shading, i.e. fully light-blocking.

Alternatively, the back-injecting of the component top layer with a translucent material, to form the sturdy shell-structure, is performed with a single component injection process, wherein a translucent material is injected to form the back surface of the decorative cover.

In order to achieve light being emitted substantially evenly over the outer surface of the decorative cover, during use, shading material may be provided as a tape or paint after manufacturing the cover and/or further, prior to the optional shaping of the component top layer into a shell pre-shape and/or prior to the back-injecting, a black-off pattern and/or a fade pattern print is provided onto one of the back side of the trim material layer, the backing material layer or an additional plastic foil layer is provided onto which the black-off pattern and/or fader pattern print is provided.

In order to prevent delamination or lamination warpage, when an additional layer of plastic foil is provided and the component top layer is shaped into a shell pre-shape, the additional layer of plastic foil may be pre-formed independently from the component top layer, and attached to the pre-shaped component top layer during back injecting, i.e. through providing an adhesion promotor to a front surface thereof and placing the additional foil layer into the mould after placement of the laminate pre-shape. In cases where the geometry of the trim panel is relatively flat, both the additional plastic foil and the component top layer, may not need to be pre-formed, but instead may be added separately to the back injection mould to create "in-tool lamination".

According to a fourth aspect of the disclosure, a method of manufacturing a vehicle interior trim panel including a light source component is provided, including:

providing a decorative cover according to the method of the second aspect of the disclosure;

providing a carrier plate, matching the decorative cover, such that said decorative cover can be attached to the carrier plate to form a closed unit which encloses a hollow space, wherein the carrier plate has a reflective surface facing said hollow space;

mounting at least one LED light onto the reflective surface, and placing a light plate onto the reflective surface, abutting the at least one LED light, such that the light plate transfers the light of the at least one LED light over a surface area thereof; and attaching the decorative cover to the carrier plate, such that the light plate is in between the carrier plate and the decorative cover.

BRIEF DESCRIPTION OF THE DRAWINGS

Embodiments of an interior trim panel according to the present disclosure will be described by way of example, with reference to the attached drawings, in which.

DESCRIPTION OF EMBODIMENTS

Figure 1:
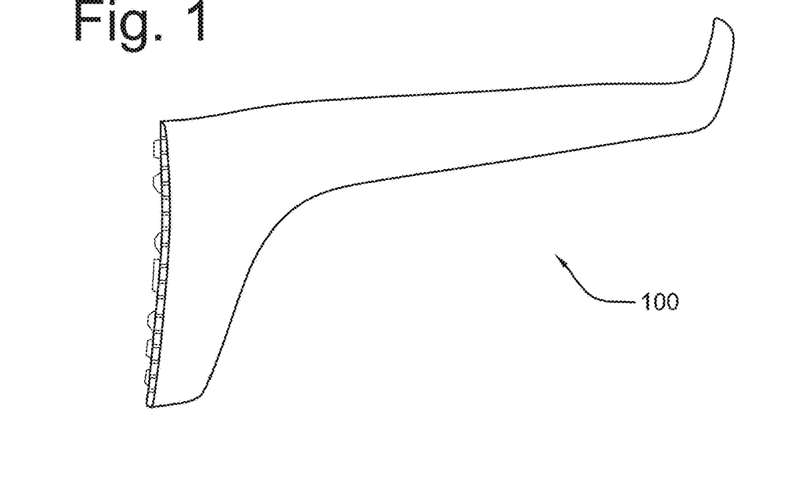
FIG. 1 shows an embodiment of an interior trim panel with decorative surface material according to the disclosure.
Figure 2:
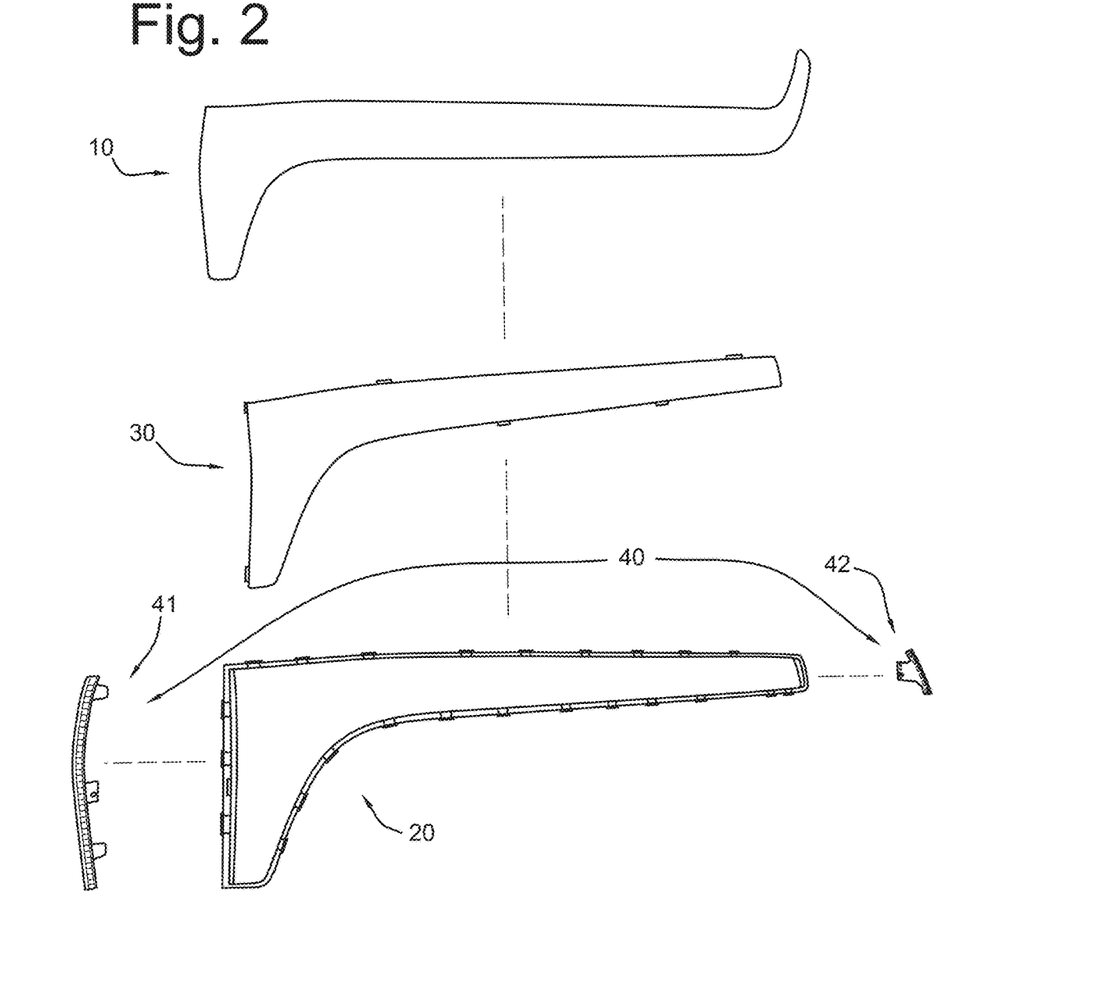
FIG. 2 shows an exploded view of the interior trim panel of FIG. 1.
Figure 3:
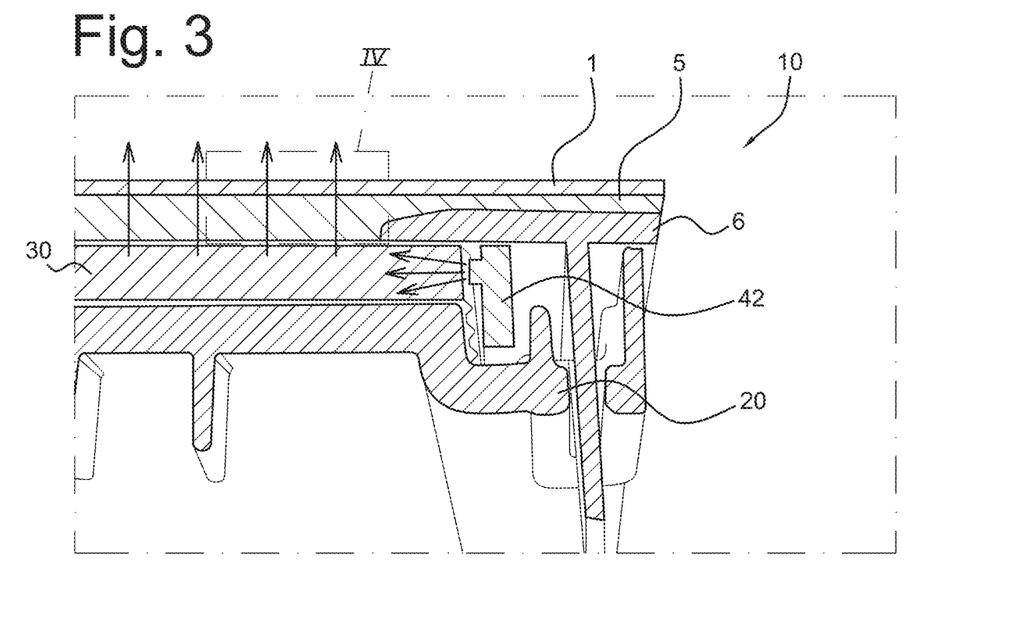
FIG. 3 shows a cross-sectional view of the interior trim panel of FIG. 1 along line III.

FIG. 1 shows an embodiment of an interior trim panel 100 with decorative surface material according to the disclosure, with FIGS. 2 and 3 respectively showing an exploded view and a cross-sectional view along line III of the same. The depicted panel 100 may be recognized as a panel for the instrument panel of a vehicle, such as a car, with the decorative surface material forming an external surface of the instrument panel This external surface is facing the inside of the vehicle, such that an occupant thereof may both visually and physically experience the decorative surface material. Similar panels may for example be used on the tunnel console or on the inside of a door panel. The decorative surface material is one of a set of materials consisting of: wood veneer, metallic sheet material, foil, paper, textile or fabric. From hereon, the external surface of the panel formed by the decorative surface material is referenced to as the outer or upper side of the panel 100, and the opposite side of the interior trim panel 100, which faces away from the vehicles interior when installed, is referenced to as the inner or lower side of the panel 100. The skilled person will recognize that vehicle interiors include many more panels, which are not limited to being installed in doorframes, and that the shape of interior trim panels depend on their installation position in the interior as well as the make and model of the vehicle, such that the specific shape of the interior trim panel 100 as depicted may be adapted accordingly.

The interior trim panel 100 is an assembly consisting of a decorative cover panel 10, and a light source component which consists of a carrier panel 20, a light plate 30 and an LED light 40. The carrier panel 20 is shaped to form the inner side of the interior trim panel 100 and adapted for being attached to the decorative cover panel 10, said panels together forming an enclosed space within which the light plate 30 and the LED light 40 are positioned. Hereto an outline shape of the carrier panel 20 substantially matches with an outline shape of the decorative component 10. The LED light is mounted onto a surface of the carrier panel 20 which faces the decorative cover panel 10. In the depicted light source component, the LED light 40 consists of two LED elements 41, 42, a first of these two LED elements 41 being positioned at a first longitudinal end of the carrier panel 20 and a second of these two LED elements 42 being positioned at a second longitudinal end of the carrier panel 20. The light plate 30 has a size and shape matching with the carrier plate 20, such that the light plate 30, in the assembled position, is press-fitted between the LED elements 41, 42 and sandwiched between the carrier panel 20 and the decorative cover panel 10. Thus, the LED elements 41, 42 flank the light plate 30 on opposite longitudinal ends and the carrier panel 20 and the decorative cover panel 10 flank the light plate 30 on the upper and lower sides. Preferably all parts, with the exception of the light plate 30, are welded together. However, other methods such as tape or clips could also be used.

Through being flanked by the LED elements 41, 42 at both longitudinal ends, the light plate 30 guides and transfers the light emitted by the LED's to be substantially evenly spread over the surface thereof. The surface of the carrier panel 20 onto which the LED light 40 is mounted is reflective, such that emitted light is reflected off said surface, towards the decorative cover panel 10. The decorative cover panel 10 is adapted to allow a predetermined amount of light shining through, when the LED light 40 is on, whilst having a seamless and solid surface-look with no visible light features when the light is off.

Hereto, as shown in FIG. 3, the decorative cover panel 10 includes a decorative component top layer 1, a translucent layer 5 and a light shading component 6. The decorative cover panel 10 is formed as a single sturdy shell, with the decorative component top layer 1 including the decorative surface material, which decorative surface material gives the cover panel 10 the seamless and solid-surface look. Although the decorative surface material is one of a set of materials which are generally considered opaque materials, these materials can be adapted to allow a predetermined amount of light shining through, i.e. adapted to have a predetermined translucency for a light positioned directly there behind, such as commonly seen in lampshades for example. Adaptations to achieve a predetermined translucency depend on the specific material chosen, and may include reducing the thickness of the material, expanding or finely perforating the material all-over and/or choosing a material with a particular tightness of warp/weft. To ensure the decorative cover panel 10 is sufficiently sturdy, a relatively thick translucent layer 5 is provided on the inside of the decorative component top layer 1. Further particularities about these layers and how they are combined are discussed down below, in relation to FIG. 4. In order to ensure a smooth light-pattern emitting from the interior trim panel 100, the decorative cover panel 10 is provided with the light shading component 6 at the position of the LED light 40. The light shading component 6 masks the LED light, to prevent a so-called hot-spots occurring directly at the location of each LED. The light shading component 6 may be substantially completely non-transparent, thereby masking off the LED light 40, or include a predetermined transparency, which predetermined transparency is less than the transparency of the translucent layer 5 and results in the LED light being shaded rather than masked off. Both options will be discussed further down below, in relation to FIGS. 4 and 5.

Figure 4:
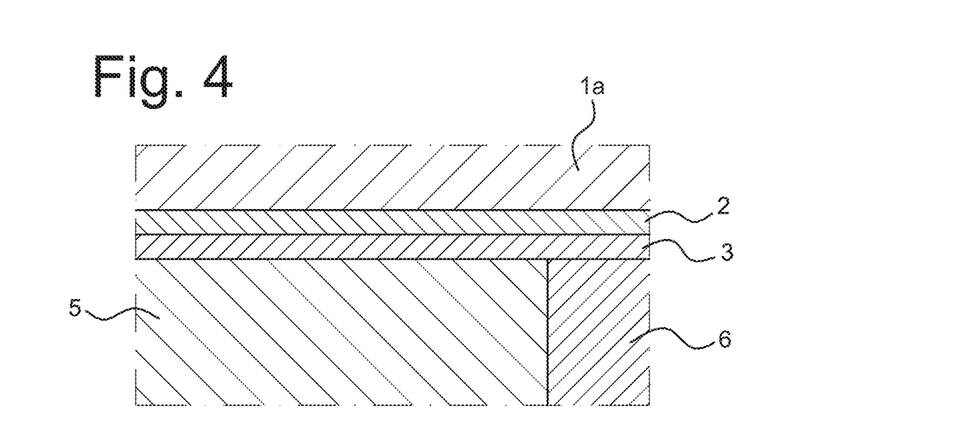
FIG. 4 shows a more detailed cross-sectional view along line III of the decorative panel of FIG. 1.

FIG. 4 shows a more detailed cross-sectional view of the decorative cover panel 10 along line III of FIG. 1. The decorative cover panel 10, top to bottom, includes the trim material layer 1*a*, a backing material layer 2, an optional plastic foil layer 3, the translucent layer 5 and the light shading component 6.

The decorative component top layer 1 depicted in FIG. 3 is formed by the trim material layer 1*a*, the backing material layer 2 and the optional plastic foil layer 3 and is non-permeable to the material of the translucent layer 5, which is back-injected onto the decorative component layer 1. This allows the decorative cover panel 10 being formed in relatively few production steps, using a single injection-molding mold and ensures the seamless and solid surface-look of said panel. The manufacturing steps prior to back-injecting, as well as the presence of plastic foil layer 3 and material choice for the backing material layer 2, depend on the specific material chosen for the trim material layer 1*a*. Even the presence of the backing material layer 2 may be optional, if the trim material layer 1*a* is both sufficiently strong, i.e. non-fragile, for being handled on its own during production and non-permeable to the back-injected material for the translucent layer 5. Typically, the decorative component top layer 1 has a thickness ranging between 0.4 mm and 3.8 mm, preferably between 0.6 mm and 1.2 mm, with the translucent layer 5 being between 2 and 3 mm thick and the light shading component being around 1 mm thick. Depending on the trim material used, the decorative component top layer 1 may have a trim material layer 1a of between 0.1 mm and 1 mm, preferably of around 0.3 mm, a backing material layer of between 0.1 and 0.4 mm and a plastic foil layer of between 0.2 and 0.5 mm thickness. For wood veneer, the thickness depends on the veneer type, and is usually in the range of 0.2-0.8 mm.

For example, when a wood veneer is chosen as the trim material layer 1a. The wood veneer is laminated with a stabilizing translucent backing material 2, such as non-woven fleece or any type of fabric, prior to being sanded down to a minimal thickness required to increase translucency of the wood. The backing stabilizes the wood veneer prior to further processing, allowing it to be handled after the sanding down to minimal thickness, which would otherwise leave the veneer too fragile for further manufacturing steps such as the back injection. The laminate is then pre-shaped into a desired geometry for the interior trim panel 100, after which the laminate is back-injected with translucent material for forming the translucent layer 5, to create the sturdy yet translucent to back-lightening decorative cover panel 10. The wood veneer can be treated with a coating system to protect the surface from moisture, heat and UV exposure after back-injecting.

An alternative to wood veneer is to use expanded metal as the trim material layer 1a. Expanded metal is sufficiently stable for handling, but through being expanded it lacks the required non-permeability for the material that is to be back-injected. Therefore, the expanded metal is first laminated onto a plastic foil, which plastic foil forms the backing material layer 2 for the expanded metal. Coating treatment of the expanded metal can be performed either before expansion, before lamination onto the plastic foil or after the lamination onto the plastic foil.

Preferably, the translucent layer 5 is injection molded together with the material forming the structure of the light shading component 6 in a single injection process. This may be through a single material injection molding process, wherein the translucent layer 5 and the structure of the light shading component 6 are both formed by the same translucent material. The material providing the properties for providing the desired shading or masking off of the light shading component 6 may provided in a post-processing step through the application of tape or paint. Preferably, however, the back-injecting is performed with a two component injection process, using a single mold. A first of the two components used in this two component injection process is the translucent material for forming the translucent layer 5 and the second component is a light blocking or shading material for forming the light shading component 6.

Figure 5A:
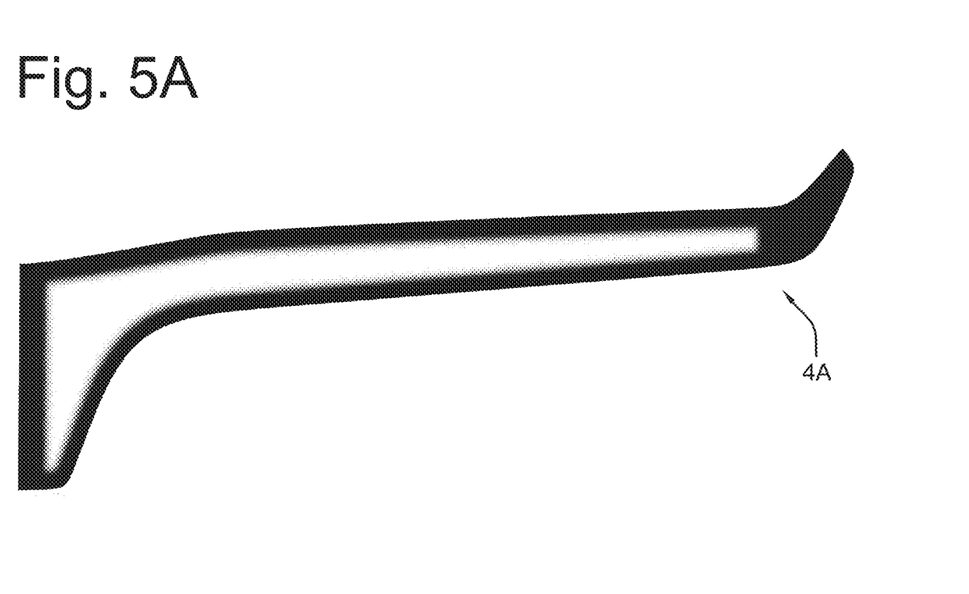
FIGS. 5A and 5B respectively show an example of a fade print and a pattern print for a decorative panel as depicted in FIG. 1.
Figure 5B:
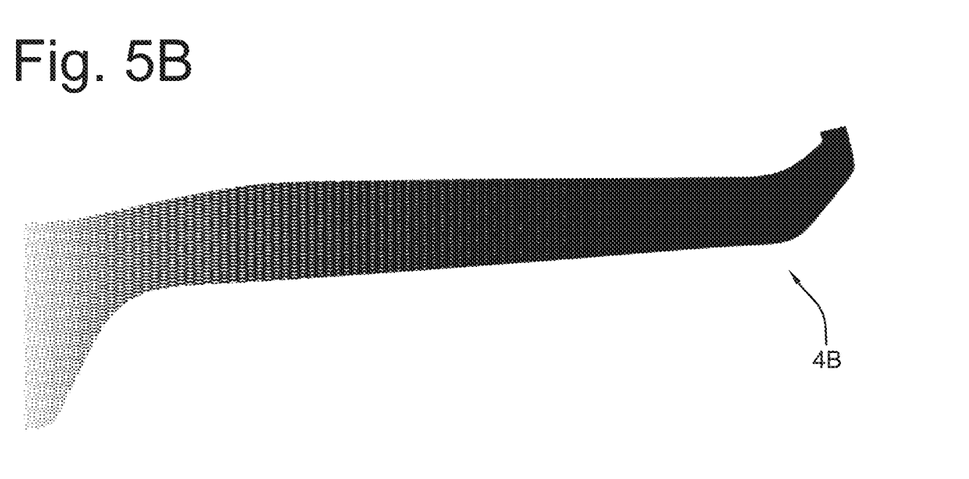

In order to achieve a homogeneous lightening, when fully masking off the LED's, or to achieve a predefined light pattern design shining through the trim material layer 1a, optionally a pattern print may be added to the lower side of the laminate. This pattern print is a so-called black-off pattern and/or a fade pattern, which, when both are applied, may be applied as two independent pattern layers or as a single, merged pattern. The pattern print can be printed directly onto one of the back surface of the trim material layer 1a, the backing material layer 2, or onto an additional plastic foil layer 3, depending on the used trim material, backing material and particular requirements from the light pattern design. The advantage of printing the pattern onto a plastic foil is that a higher resolution print can be achieved than when printing onto fabric or fleece. Where the print is provided onto an additional optional plastic foil layer 3, this layer may be pre-shaped independently from the laminate, provided with an adhesion promotor on a top side thereof and be stacked with the laminate into the mold for being back-injected to form the decorative cover panel 10. An example for a black-off pattern print, for masking off the edges of the light plate 30 and the LED's of the interior trim panel 100, is depicted in FIG. 5A. An example for a fade pattern print for the same panel is depicted in FIG. 5B.

It will be obvious to the skilled person that the other trim materials listed for use as trim material layer can be processed similarly to the wood veneer and/or expanded metal during the manufacturing of the decorative cover panel 10.

The present disclosure has been described above with reference to a number of exemplary embodiments as shown in the drawings. Modifications and alternative implementations of some parts or elements are possible, and are included in the scope of protection as defined in the appended claims.

The invention claimed is:

1. A decorative cover for a back-illuminated interior trim panel for a vehicle, said cover being a sturdy shell-structure comprising a transparent plate, forming the back side of the shell-structure, and a decorative component top layer comprising a trim material layer, which forms the outer surface of the decorative cover, wherein the trim material layer is formed from a trim material which is one from a group of materials consisting of a wood veneer, a paper, a textile and a fabric, wherein the decorative component top layer is configured to have a predetermined degree of translucency, and wherein the sturdy shell-structure is formed by back-injecting against the decorative component top layer, such that the sturdy shell-structure is a seamless, single component structure and wherein the decorative component top layer is non-permeable to the back-injected material.

2. The decorative cover according to claim 1, wherein the transparent plate, at predetermined sections, is provided with shading means, for locally reducing an amount of light being transmitted through the plate.

3. The decorative cover according to claim 1, wherein the decorative component top layer is a laminate, which comprises an upper layer consisting of the trim material layer, and a backing material layer.

4. The decorative cover according to claim 3, wherein the backing material layer is formed by one of a fleece, a fabric or a plastic foil.

5. The decorative cover according to claim 1, wherein a back surface of the decorative component top layer is provided with a black-out pattern and/or a fade pattern print, or wherein a further plastic foil layer is provided adjacent the backing material layer, said further plastic foil being provided with the black-out pattern and/or the fade pattern print.

6. The decorative cover according to claim 1, wherein the trim material layer is provided with a coating for protecting the surface from moisture, heat and/or UV exposure.

7. An interior trim panel for a vehicle, comprising the decorative cover according to claim 1, further comprising a light source component comprising:
   a carrier plate, shaped to form a back surface of the interior trim panel and having a reflective surface,
   at least one LED light, mounted onto the reflective surface, and
   a light plate, positioned adjacent to the at least one LED light onto the reflective surface, such that the light plate transfers the light of the at least one LED light over a surface area thereof,
   wherein the decorative cover is attached to the carrier plate, such that the interior trim panel is a closed light unit with the decorative cover forming a front surface thereof and the decorative cover and carrier plate together enclosing the at least one LED light and light plate.

8. A method of manufacturing a decorative cover for a vehicle interior trim panel comprising a light source component, comprising:
providing a non-permeable decorative component top layer, comprising a trim material layer which is formed from a trim material that is one from a group of materials consisting of a wood veneer, a metallic sheet material layer, a paper, a textile and a fabric, and which is configured to have a predetermined degree of translucency; and
back-injecting the decorative component top layer with a translucent material, to form a seamless sturdy shell-structure, with the trim material forming an outer surface and said translucent plastic forming an inner surface of the decorative cover.

9. The method according to claim 8, wherein the providing of a non-permeable decorative component top layer comprises forming a laminate by attaching the layer of trim material onto a backing material layer and optionally further comprising sanding down the layer of trim material to a minimum thickness after attaching said trim material onto the backing material layer to achieve the predetermined degree of translucency.

10. The method according to claim 8, wherein the providing of a non-permeable decorative component top layer comprises the expanding and/or stretching of the layer of trim material and wherein, when the layer of trim material is attached onto a backing material layer afterwards, the backing material layer is a plastic foil.

11. The method according to claim 8, wherein the back-injecting of the component top layer with a translucent material, to form the sturdy shell-structure, is performed with a two component injection process, wherein a first component is the translucent material and wherein a second component is a shading material that reduces light transfer therethrough, wherein said second component is injected in predetermined areas where light from the light source is to be masked.

12. The method according to claim 8, wherein the back-injecting of the component top layer with a translucent material, to form the sturdy shell-structure, is performed with a single component injection process, wherein a translucent material is injected to form the back surface of the decorative cover.

13. The method according to claim 12, wherein prior to the shaping of the component top layer into a shell pre-shape and/or prior to the back-injecting, a black-off pattern and/or a fade pattern print is provided onto the back side of the trim material layer, the backing material layer and/or onto an additional plastic foil layer.

14. A method of manufacturing a vehicle interior trim panel comprising a light source component, comprising:
providing the decorative cover according to the method of claim 9;
providing a carrier plate, matching the decorative cover, such that said decorative cover can be attached to the carrier plate to form a closed unit which encloses a hollow space, wherein the carrier plate has a reflective surface facing said hollow space;
mounting at least one LED light onto the reflective surface, and
placing a light plate onto the reflective surface, abutting the at least one LED light, such that the light plate transfers the light of the at least one LED light over a surface area thereof; and
attaching the decorative cover to the carrier plate, such that the light plate is in between the carrier plate and the decorative cover.

15. The method according to claim 8, further comprising shaping the decorative component top layer into a shell pre-shape having a desired geometry for forming an outer surface of the decorative cover.

* * * * *